Patented Mar. 1, 1949

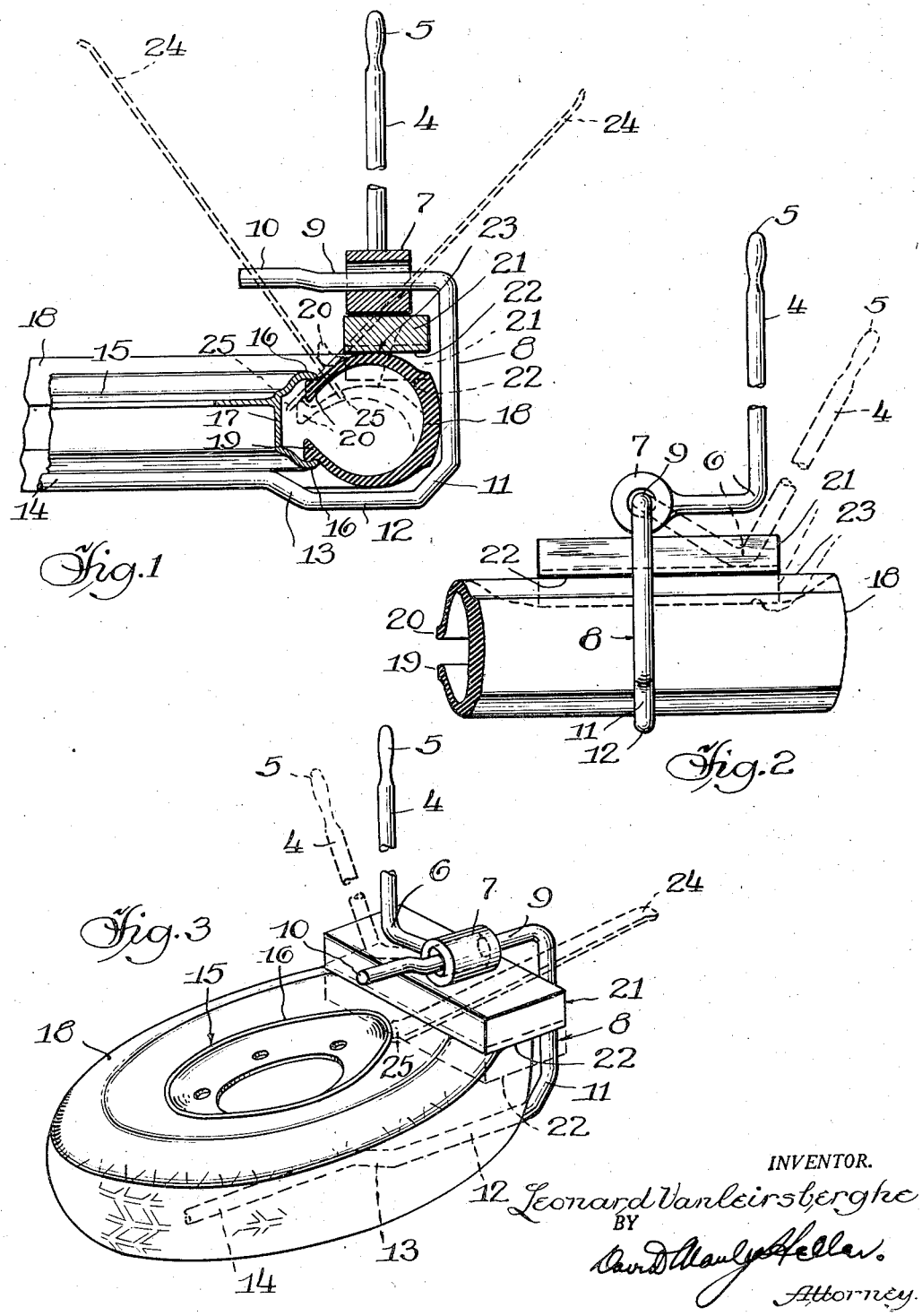

2,463,071

UNITED STATES PATENT OFFICE 2,463,071

LEVER ACTUATED PORTABLE TIRE REMOVING TOOL

Leonard Vanleirsberghe, La Grange Park, Ill.

Application August 17, 1945, Serial No. 610,968

2 Claims. (Cl. 157—1.26)

My invention relates to tire removing tools, and has for its main object to provide a tool for removing a tire from a rim of a wheel which includes three structural elements, substantially a U shaped support, a lever articulately secured thereto and a pressure block intermediately disposed between the said lever and the said U shaped support.

Another object of my invention is to provide a tire tool made up of three elements which can be readily assembled for use, and readily dismantled so as to occupy the minimum space in the storage compartment of a vehicle.

Another object of my invention is to provide a tire removing tool of the aforementioned character, which is simple in construction, practical and efficient in its operation and use, and of such elemental construction enabling manufacture thereof economically in quantity production.

Other features, objects and advantages inherent in my invention will become readily apparent to those skilled in the art, by reference to the accompanying drawings, when taken in connection with the ensuing description wherein like numerals, or symbols, designate like parts, and in which;

Fig. 1 is a cross-sectional view taken, substantially, perpendicular to the tire 18, and parallel to the support 8 of Fig. 3.

Fig. 2 is an end view of Fig. 1, and;

Fig. 3 is a perspective view showing my tool in assembled position with respect to a tire to be removed from a rim, showing the manipulation thereof in order to effectively remove the tire from the rim.

Referring to the various figures, my invention consists of a lever element 4 having a suitable manipulating handle 5, being further provided with a knee portion 6 and terminating in an enlarged bearing portion 7 having a bored opening therein of larger diameter than that of the leg 9 to fit the U shaped support generally designated 8, and being articulately and removably secured to its upper leg 9. It is to be noted that the said leg 9 terminates in an offset portion 10 so as to, more or less, confine the operation of the bearing 7 and prevent the same from sliding along the leg 9 when pressure is applied at a time when the lever 4 is moved to the dotted position to depress the tire 18. The support 8 is also formed with an angular portion 11, and contiguous therewith the portion 12 and the angular portion 13 forming a suitable locating well or recess for the cross-sectional configuration of the tire 18, ultimately terminating in an end 14 which is of suitable length in order to aid in cradling the rim 15 of a vehicle wheel. The said vehicle rim is provided with a depressed peripheral portion 17 terminating in the flanged retainer 16 which aids in securing the lips 19 and 20 of the tire 18. The conventional form of inflating tube secured within the confines of the inner recess of the tire 18 is not indicated as that can be readily understood by those familiar with the art.

The two units, heretofore mentioned, 4 and 8 respectively, are brought into cooperative engagement by the intermediate block 21 which may be made of wood or other similar material, the said block being of suitable magnitude so that when placed in the position shown in Figs. 1 and 3 will engage a substantial cordal section of the tire 18 and cause the same to be depressed as shown by the dotted lines in Figure 1. When the lever is manipulated in a clockwise direction as shown by the dotted lines of Figure 2, its knee engages the top of the block 21 at the same time forcing its lower surface 22 to depress the top surface of the tire 23 to the dotted position shown in Figure 2. The said action causes the upper lip portion 20 to be depressed so that within the space created between the rim flange 16 and lip 20, a prying lever or tool 24 may have its terminus 25 inserted therebetween, and by moving the same in a counter-clockwise direction as indicated in Figure 1 through the dotted positions shown, the lip 20 is caused to be raised above the flanged portion 16, thus removing a portion of the lip. The same procedure is repeated several times in removing the tire from a rim as heretofore elucidated. It is understood that the air pressure within the tube confined therein is first brought to a deflated state so as to permit depression of portion 23 of the tire 18, the same operation being repeated around the periphery of the tire 18 a number of times until enough of the lip portion 20 is removed so as to enable the rim 15 to be separated from the tire 18 which may require repairs or may have to be replaced by another tire after the same has become worn and no longer useful. The elements 4, 8, and 21 are readily dismantled and put away when not in use occupying a minimum space in a compartment of a vehicle provided therefor. I wish to stress, particularly, that the pressure block 21 is not attached to either of its cooperating elements, namely, the lever 4, nor the support 8.

Although I have herein indicated a general disclosure as to the construction of the parts, it is to be understood, that the same being susceptible of variations, that I hereby reserve the right to such variations which come within the scope and spirit of my invention as claimed.

Having thus revealed and described my invention, what I claim as novel and desire to secure as Letters Patent, is:

1. A device of the character described comprising, a U shaped support having a slight offset portion on a leg thereof, a lever element provided with a sleeve on one end thereof and having an enlarged bore therein slidably and removably journalled on the said leg for rotation thereon as an axis, the said lever element provided with a pressure knee portion intermediate its ends, the plane of operation of the said lever element being disposed at right angles to the plane of the said U shaped support, and a pressure block associated with the said U shaped support and the said lever element adapted to exert pressure on a body introduced into the said U shaped support when force is applied to the free end of the said lever element.

2. A device of the character described comprising, a U shaped support having a slight offset portion on a leg thereof, a lever element provided with a sleeve on one end thereof and having an enlarged bore therein slidably and removably journalled on the said leg for rotation thereon as an axis, the said lever element provided with a pressure knee portion intermediate its ends.

LEONARD VANLEIRSBERGHE.

REFERENCES CITED

The following references are of record in the file of this patent:

UNITED STATES PATENTS

| Number | Name | Date |
|---|---|---|
| 840,207 | Glickert et al. | Jan. 1, 1907 |
| 1,041,660 | Nelson | Oct. 15, 1912 |
| 1,116,924 | Reid | Nov. 10, 1914 |
| 1,447,113 | Woodhall | Feb. 27, 1923 |
| 2,034,819 | Maulis | Mar. 24, 1936 |
| 2,217,139 | Smith | Oct. 8, 1940 |

FOREIGN PATENTS

| Number | Country | Date |
|---|---|---|
| 199,995 | Germany | July 4, 1908 |
| 26,671 | Great Britain | Nov. 24, 1908 |